United States Patent [19]

Schoumaker

[11] Patent Number: 4,541,599

[45] Date of Patent: Sep. 17, 1985

[54] SELF-LOCKING MOUNTING CLIP SYSTEM

[75] Inventor: Raoul J. P. Schoumaker, Wyoming, Mich.

[73] Assignee: Westinghouse Electric Corp., Pittsburgh, Pa.

[21] Appl. No.: 524,809

[22] Filed: Aug. 19, 1983

[51] Int. Cl.[4] .......................... A47F 5/08; A47G 29/02
[52] U.S. Cl. .................................... 248/222.2; 248/243
[58] Field of Search ................. 248/243, 222.4, 221.1, 248/214, 222.2; 211/187, 191; 108/108, 107

[56] References Cited

U.S. PATENT DOCUMENTS

| 177,911 | 5/1876 | Wolf | 248/222.2 |
|---|---|---|---|
| 1,504,523 | 8/1924 | Sherer | 248/243 |
| 3,511,193 | 5/1970 | Schild | 248/243 |
| 3,570,798 | 3/1971 | Squibb | 248/243 |
| 4,013,254 | 3/1977 | Boundy | 248/243 |
| 4,159,814 | 7/1979 | Fibus | 108/108 |

FOREIGN PATENT DOCUMENTS 1374177 8/1964 France ............................. 248/243

Primary Examiner—Reinaldo P. Machado
Assistant Examiner—Alvin Chin-Shue
Attorney, Agent, or Firm—B. R. Studebaker

[57] ABSTRACT

A self-locking mounting clip system for mounting and locking cabinets or the like to laterally spaced, vertically aligned slotted standards. The system includes a mounting clip having a series of equidistantly spaced hooked-shaped connectors mounted to the rear edge of the cabinet sidewalls with the top and bottom hook-shaped connectors of each series bent at a slight angle with respect to the remainder of the hook-shaped connectors in each series. The mounting clips are installable and removable from the slotted standard only in an angular relationship with the slotted standard and are not removable when the cabinet sidewalls are in their assembled position.

3 Claims, 3 Drawing Figures

SELF-LOCKING MOUNTING CLIP SYSTEM

BACKGROUND OF THE INVENTION

This invention is related to hardware for mounting wall cabinets and the like to space-dividing wall panels of a type employed in open-office systems and more particularly to self-locking mounting clip hardware for mounting wall cabinets and the like to the slotted standards employed in such systems.

In recent years there has been an increase in popularity of the concept of open office planning which utilizes free-standing partition systems for defining various office and work station areas. Almost all of the manufacturers of these type systems provide for the direct mounting of office accessories such as cabinets, shelves, work surfaces and the like directly to the free-standing partition or wall. Many of these systems employ what is known in the trade as a slotted standard as a part of the wall panel or partition to serve as a mounting vehicle for such accessories. The slotted standard is generally a vertical steel channel which extends over the entire vertical dimension of the panel and has therein a plurality of equidistantly spaced, vertically aligned slots which are adapted to receive a plurality of hook-shaped or T-shaped connector elements which extend from the back surface of the accessory to be mounted to the wall panel. Illustrations of the hook-type connector may be found in U.S. Pat. No. 3,877,191 for Connector Assembly and Support Post, and the T-shaped connector is illustrated in U.S. Pat. No. Re. 28,994 for Over the Cabinet Door Assembly.

It will be readily apparent that heavy accessories such as cabinets, sometimes loaded with heavy materials, or work surfaces and bookshelves are retained in their mounted position only by virtue of the vertical load provided by the accessory itself. It should be equally apparent that inadvertent jarring or accidental removal of the hook-shaped or T-shaped connectors from the slotted standard could result in a serious accident. Another problem with this type of mounting system can be illustrated with reference to the above-cited U.S. Pat. No. Re. 28,994 which discloses a backless wall-mounted cabinet which may obviously incorporate a provision for locking the cabinet door. The security of such a locked cabinet is clearly fictitious in that the cabinet can be readily removed from the wall and entered from the rear regardless of the locked door. Providing a locking mechanism in connection with the hook-shaped or T-shaped connector elements in order that any wall-mounted accessory can have its mounting hooks locked into the slotted standard and which locking mechanism can be released only through positive action as opposed to inadvertent actuation, can eliminate the hazards of such wall-mounted accessories accidentally falling from the wall. Additionally, providing that the cabinet must be entirely disassembled in order for the sidewalls to be removed from the slotted standard precludes the removal of the cabinet from the wall when the cabinet door is in a locked configuration.

Several different mechanisms have been disclosed for locking hook-shaped connectors into slotted standards. For example, U.S. Pat. No. 3,601,432 to Fenwick discloses a swingable latch-type member for this purpose but inadvertent removal of the latch would render the mounted accessory susceptible to being dislodged from the slotted standard. U.S. Pat. No. 4,013,254 to Bruce K. Boundy et al. for Mounting Clip Lock discloses a positive latching mechanism in which a two-part clip is employed and by varying the spacings of the two parts of the clip, positive locking results. Again, if the pin connector that holds the one portion of the locking clip in a fixed position is not in place, the cabinet is again susceptible of being inadvertently jostled loose from the slotted standard. U.S. Pat. No. 3,517,467 to Probst et al. for Structural Support System for Shelving discloses a system wherein all of the hook-shaped connectors are angularly disposed with respect to the support bracket and are constructed specifically to co-act with a slotted standard that is set at an angle with respect to the plane of the wall panel and theoretically cannot be removed from the slotted standard when the two support brackets are assembled to a shelf or the like. This particular configuration can only be utilized with the unusual angularly disposed slotted standard and is not compatible with a slotted standard lying in a plane parallel to the planar surface of the wall panel.

SUMMARY OF THE INVENTION

The self-locking mounting clip system of this invention is designed for use in connection with a pair of cabinet or shelf lateral supports which are intended for mounting to a pair of laterally spaced, vertically extending slotted standards. The mounting clip system includes a first and second mounting clip secured respectively to the rear edge of first and second cabinet sidewalls with the first and second mounting clips including a series of hook-shaped connectors extending rearwardly of the cabinet sidewall with the upper and lower hook-shaped connectors in each series being angled inwardly slightly with respect to the remainder of the series of hook-shaped connectors. The angular relationship between the ends of the upper and lower hook-shaped connectors and the ends of the remainder of the hook-shaped connectors in said series is such as to allow insertion and removal of the hook-shaped connectors only when the cabinet sidewalls are positioned at an angle with respect to the slotted standard. The mounting clips are intended for retentitively mounting a cabinet or the like to a vertical surface having laterally spaced mounting strips thereon with the mounting strips including a plurality of linearly aligned equidistantly spaced slots therein, with the slots lying in a plane parallel to the vertical surface. The mounting clips comprise a base portion constructed and arranged to be secured to a cabinet sidewall at one edge and include a plurality of hook-shaped connectors extending from the other edge of the base portion to define a planar extension of the cabinet sidewall. At least one of the plurality of hook-shaped connectors being bent angularly with respect to the remainder of the hook-shaped connectors whereby when said hook-shaped connectors are inserted through and interlocked with the slots and the mounting clip rotated to a normal relationship with the slotted standard, the at least one angularly bent hook-shaped connector will prevent the mounting clip from being removed from the slotted standard. Preferably, the at least one angularly bent hook-shaped connector is both the top and bottom hook-shaped connectors in a linear series of hook-shaped connectors.

BRIEF DESCRIPTION OF THE DRAWINGS

Many of the attendant advantages of the present invention will become more readily apparent and better understood as the following detailed description is considered in connection with the accompanying drawings in which.

DESCRIPTION OF THE PREFERRED EMBODIMENT

Figure 1:
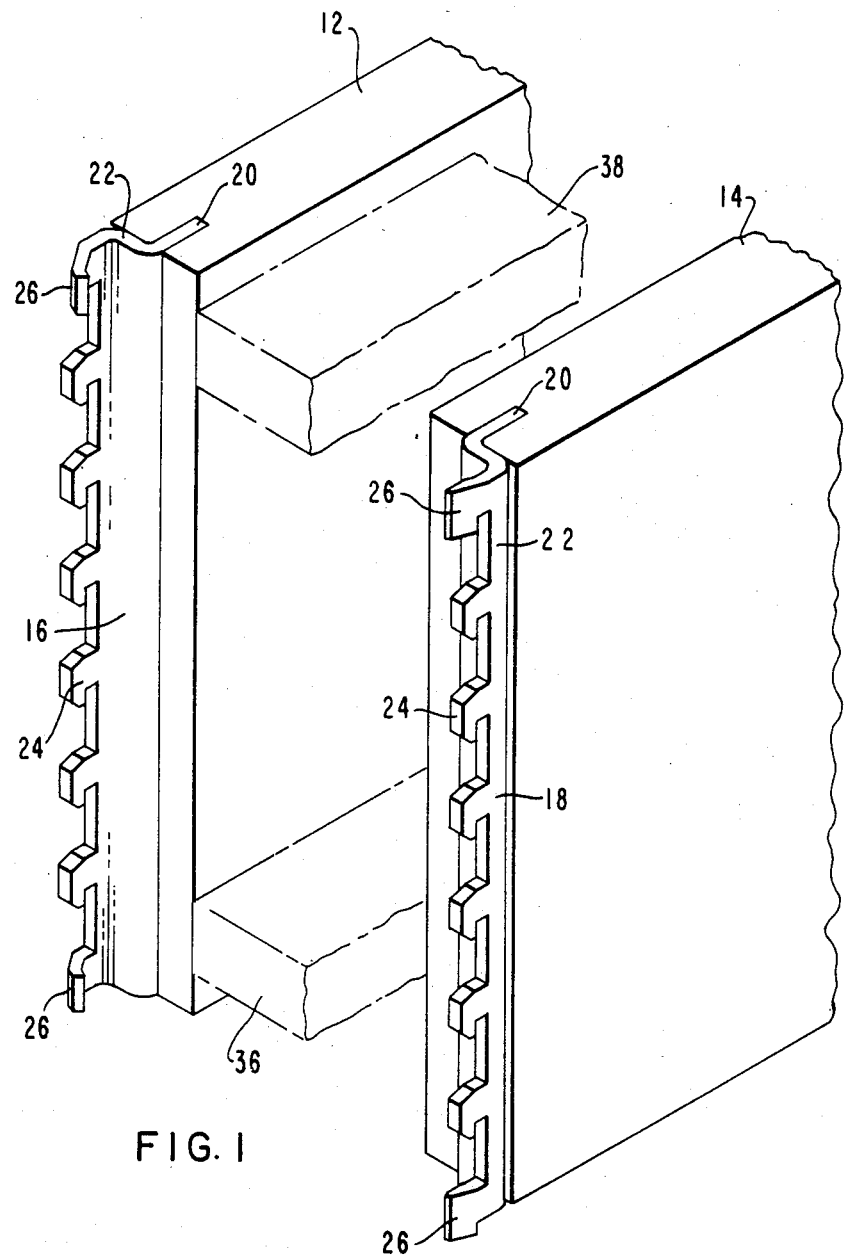
FIG. 1 is a partial perspective view of a pair of cabinet sidewalls employing the connector of this invention.

Referring now in detail to the drawings wherein like reference characters represent like parts throughout the several views, there is illustrated in FIG. 1 a pair of cabinet sidewalls or shelf supports 12 and 14. The right hand (when viewed from the front of the cabinet or shelf) 12 has a right-hand mounting clip 16 secured thereto while the left-hand side panel or shelf support 14 has a left-handed mounting clip 18 secured thereto. It is preferred that the mounting clips 16 and 18 be "handed" in practicing the preferred embodiment of this invention, but it should also be understood that the concept of this invention could be practiced with a single "unhanded" clip configuration without departing from the scope of this invention.

The mounting clips 16 and 18 include a base portion 20 which is secured to the rear edge of the wall panels 12 and 14 and an intermediate portion 22 from which there extends a plurality of hook-shaped connectors 24 in linear alignment. As illustrated in FIG. 1, each of the upper and lower hook-shaped connectors 26 in the series of hook-shaped connectors 24 are bent at a slight angle inwardly to provide the locking function when the cabinet is mounted to a slotted standard of a space-dividing wall panel.

Figure 2:
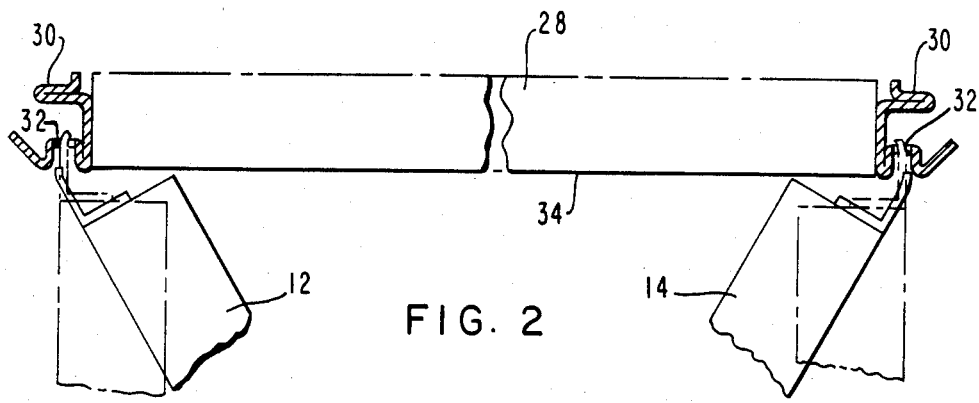
FIG. 2 is a partial top plan view illustrating the mounting of the cabinet sidewalls of FIG. 1 to the slotted standards of a space-dividing wall panel.
Figure 3:
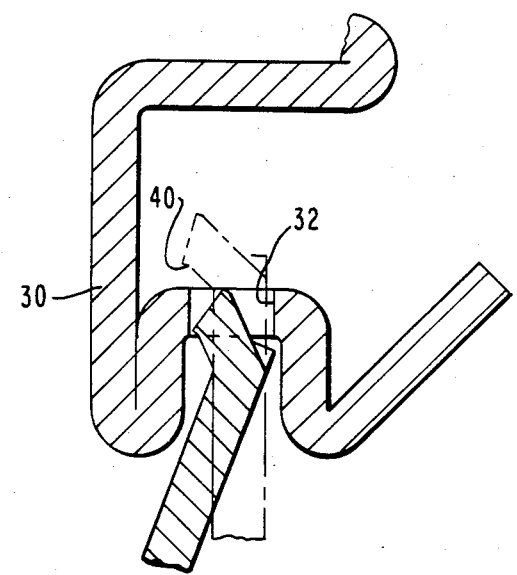
FIG. 3 is an enlarged sectional view of the interconnection of the slotted standard and the connector of this invention.

Referring now to FIG. 2, there is illustrated a typical space-dividing wall panel 28 which has at each end mounted thereto a vertical slotted standard 30 which has a plurality of linearly aligned, equidistantly spaced slots 32 therein which are adapted to receive at any point along the vertical extent of the panel an office accessory as for example a cabinet, shelf, support rail, work surface or the like. As will be seen from FIG. 2 the slots 32 in the slotted standard 30 are recessed slightly from the planar front surface 34 of the wall panel 28 but lie in a plane which is parallel to the face of the wall panel. The lateral distance between the edge of the slightly bent hook-shaped connectors 26 and the edge of the remainder of the series of hook-shaped connectors 24 is such that the hooks on the mounting clip will not fit through the slots in the slotted standard directly, but must be rotated through the slot in order for the connectors to enter. As best illustrated in FIG. 2, the cabinet sidewalls 14 and 12 are presented to the slots 32 in the slotted standard 30 at a slight angle and only through rotation of the hook-shaped connectors 26 and 24 will the mounting clip enter through the slots 32. After entry is accomplished, the sidewalls 12 and 14 have completed rotation to their normal position perpendicular to the wall panel 34 and the hook-shaped connectors are moved downwardly in the slot to lock the sidewalls 12 and 14 into position. At this point, the shelf or cabinet is completed by securing either a lower shelf 36 to the inner surfaces of the cabinet sidewalls or both a lower shelf 36 and a cabinet top 38. With the cabinet or shelf thus assembled, the sidewalls 12 and 14 are now prohibited from rotating toward each other and the end edges of the slightly bent hook-shaped connectors 26 are positioned behind the sides of the slot 32 as illustrated at 40 in FIG. 3, thus permanently locking the cabinet or shelf to the slotted standard. As will be apparent, only by disassembling the shelf or cabinet can the sidewalls be rotated to a position from which they can be removed from the slotted standard.

As will be apparent from the foregoing, the self-locking mounting clip of this invention when interconnected with the slotted standard and the remainder of the shelf or cabinet formed, it is not possible for the shelf or cabinet to be inadvertently dislodged from the slotted standard and that only by disassembling the cabinet or shelf can the hooked connectors be removed from the slotted standard. Although right- and left-handed mounting clips have been disclosed and are preferred, it will be apparent that single-handed duplicate connectors could be employed with only a slight danger that a canted mounting cabinet or shelf could be forced out of its locked position with the slotted standard.

What is claimed is:

1. In combination with a pair of cabinet sidewalls each having a rear edge, a self-locking mounting clip system for use in connection with a pair of laterally spaced, vertically extending slotted standards, said mounting clip system comprising:

first and second mounting clips secured respectively to the rear edge of first and second cabinet sidewalls, said first and second mounting clips having a series of vertically slotted hook-shaped connectors, including upper and lower hook-shaped connectors, extending rearwardly of said cabinet sidewalls with the upper and lower hook-shaped connectors in each series being angled inwardly slightly with respect to the remainder of said series of hook-shaped connectors with the angular relationship between the ends of the upper and lower hook-shaped connectors and the ends of the remainder of the hook-shaped connectors in said series being such as to allow insertion and removal of said hook-shaped connectors through the slots in the slotted standards only when said cabinet sidewalls are positioned at an angle with respect to said slotted standards.

2. Mounting clips for retentitively mounting a cabinet or the like to a vertical surface having laterally spaced mounting strips thereon, said mounting strips including a plurality of linearly aligned, equidistantly spaced slots therein with said slots being in a plane parallel to said vertical surface, said mounting clips comprising:

a base portion constructed and arranged to be secured to a cabinet sidewall, a plurality of vertically slotted hook-shaped connectors, including top and bottom hook-shaped connectors, extending from said base portion to define a planar extension of said cabinet sidewall, at least one of said hook-shaped connectors being bent angularly with respect to the remainder of said hook-shaped connectors whereby when said hook-shaped connectors are inserted through and interlocked with said slots and said mounting clip rotated to a normal relationship with said slotted standard, said at least one angularly bent hook-shaped connector will prevent the mounting clip from being removed from said slotted standard.

3. The mounting clips according to claim 2 wherein said at least one angularly bent hook-shaped connector is the top and bottom hook-shaped connectors in a linear series of hook-shaped connectors.

* * * * *